(12) United States Patent
Sekizawa et al.

(10) Patent No.: US 10,661,617 B2
(45) Date of Patent: May 26, 2020

(54) TIRE MOUNT SENSOR

(71) Applicant: DENSO CORPORATION, Kariya, Aichi-pref. (JP)

(72) Inventors: Takatoshi Sekizawa, Kariya (JP); Hideyuki Ikemoto, Kariya (JP); Masashi Mori, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 156 days.

(21) Appl. No.: 16/064,694

(22) PCT Filed: Dec. 1, 2016

(86) PCT No.: PCT/JP2016/085656
§ 371 (c)(1),
(2) Date: Jun. 21, 2018

(87) PCT Pub. No.: WO2017/110398
PCT Pub. Date: Jun. 29, 2017

(65) Prior Publication Data
US 2018/0370301 A1 Dec. 27, 2018

(30) Foreign Application Priority Data
Dec. 25, 2015 (JP) .................. 2015-254734

(51) Int. Cl.
*B60C 23/04* (2006.01)
*B60W 40/06* (2012.01)
(Continued)

(52) U.S. Cl.
CPC ........ *B60C 23/0493* (2013.01); *B60C 11/243* (2013.01); *B60C 19/00* (2013.01);
(Continued)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 5,844,286 A   12/1998  Hase
6,030,478 A   2/2000   Koch et al.
(Continued)

FOREIGN PATENT DOCUMENTS

JP  H10002912 A  1/1998
JP  H11278021 A  10/1999
(Continued)

*Primary Examiner* — Andre J Allen
(74) *Attorney, Agent, or Firm* — Harness, Dickey & Pierce, P.L.C.

(57) ABSTRACT

A protruding portion is provided on a molded resin portion of a tire mount sensor, and the longitudinal direction of the protruding portion is aligned with the longitudinal direction of an antenna. Further, the longitudinal direction of the antenna is set at a predetermined angle with respect to the acceleration detection direction of the G sensor. For example, with a predetermined angle of 0°, the longitudinal direction of the antenna may be matched with the acceleration detection direction of the G sensor.

7 Claims, 5 Drawing Sheets

(51) Int. Cl.
*G01M 17/02* (2006.01)
*B60C 19/00* (2006.01)
*B60C 11/24* (2006.01)

(52) U.S. Cl.
CPC ............ *B60W 40/06* (2013.01); *G01M 17/02* (2013.01); *B60C 2019/004* (2013.01); *B60G 2204/113* (2013.01)

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 23/0493; B60C 19/00; B60C 23/04; B60C 23/0498; B60C 23/064; B60C 23/0488; B60C 23/0496; B60C 23/0408; B60C 23/041; B60C 23/0411; B60C 23/20; B60C 23/0486; B60C 23/06; B60C 11/243; B60C 11/246; B60C 23/061; B60C 99/00; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0457; B60C 23/0462; B60C 23/0467; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................. 73/146–146.8
See application file for complete search history.

(56) References Cited

U.S. PATENT DOCUMENTS

| | | | |
|---|---|---|---|
| 2002/0148286 A1* | 10/2002 | Losey | B60C 23/0408 73/146 |
| 2006/0130571 A1* | 6/2006 | Thrush | B60C 23/0408 73/146.2 |
| 2006/0205106 A1 | 9/2006 | Fukuda et al. | |
| 2009/0049911 A1 | 2/2009 | Fukuda et al. | |
| 2009/0064785 A1 | 3/2009 | Fukuda et al. | |
| 2009/0071249 A1 | 3/2009 | Kitazaki et al. | |
| 2009/0105921 A1 | 4/2009 | Hanatsuka et al. | |
| 2009/0151829 A1* | 6/2009 | Lionetti | B60C 23/0493 152/152.1 |
| 2012/0298272 A1 | 11/2012 | Tanno et al. | |
| 2018/0297424 A1* | 10/2018 | Mori | B60C 19/00 |
| 2019/0143987 A1* | 5/2019 | Sekizawa | G01K 13/00 73/146 |
| 2019/0184773 A1* | 6/2019 | Saito | G01H 1/00 |

FOREIGN PATENT DOCUMENTS

| | | |
|---|---|---|
| JP | 2005132177 A | 5/2005 |
| JP | 2006142993 A | 6/2006 |
| JP | 2006162387 A | 6/2006 |
| JP | 2006263902 A | 10/2006 |
| JP | 2008254559 A | 10/2008 |
| JP | 2012240603 A | 12/2012 |
| WO | WO-2006135090 A1 | 12/2006 |

* cited by examiner

ACCELERATION DETECTION DIRECTION

TIRE MOUNT SENSOR

CROSS-REFERENCE TO RELATED APPLICATIONS

This application is a U.S. National Phase Application under 35 U.S.C. 371 of International Application No. PCT/JP2016/085656 filed on Dec. 1, 2016 and published in Japanese as WO 2017/110398 A1 on Jun. 29, 2017. This application is based on and claims the benefit of priority from Japanese patent application No. 2015-254734 filed on Dec. 25, 2015. The entire disclosures of all of the above applications are incorporated herein by reference.

TECHNICAL FIELD

The present disclosure relates to a tire mount sensor disposed inside a tire.

BACKGROUND ART

Conventionally, in Patent Document 1, there is proposed a road surface condition detection device that detects a road surface condition by using a tire mount sensor mounted on the inner side of a tire, e.g., the rear surface of the tread of the tire. According to this road surface condition detection device, the road surface condition is detected by detecting a vibration transmitted to the tire using an acceleration sensor (hereinafter referred to as a G sensor) provided in the tire mount sensor and analyzing this vibration waveform.

PRIOR ART LITERATURES

Patent Literature

Patent Literature 1: WO 2006/135090 A1

SUMMARY OF THE INVENTION

In the above-mentioned patent literature, the G sensor provided in the tire mount sensor detects acceleration in the radial direction of the tire, i.e., in the centrifugal direction. Accordingly, the mounting direction of the tire mount sensor on the tire is not taken into consideration.

However, when the acceleration direction desired to be acquired by the G sensor is different from the radial direction of the tire, it is necessary for a manufacture operator who attaches the tire mount sensor to the tire to be able to recognize the acceleration detection direction of the G sensor. However, in addition to the G sensor, the tire mount sensor is provided with a circuit board on which a microcontroller (hereinafter abbreviated as MCU) and peripheral elements are mounted, a power supply (for example, a battery), an antenna, etc. Accordingly, it is not easy to recognize the acceleration detection direction of the G sensor. Further, since the tire mount sensor is attached to the tire in a state in which the G sensor, the circuit board, the power supply, and the antenna are resin-molded together. Accordingly, it is further not easy to recognize the acceleration detection direction of the G sensor with respect to the resin-molded tire mount sensor.

In view of the above, it is an object of the present disclosure to provide a tire mount sensor in which an acceleration direction by a G sensor may be easily recognized and an acceleration direction of a G sensor with respect to a tire attachment surface may be easily adjusted, and a sensor device that includes the tire mount sensor.

A tire mount sensor according to the present disclosure is attached to an inner wall surface of a tire, and includes a G sensor that detects acceleration acting on the tire, a circuit board having one surface and another surface opposite to the one surface, the G sensor being mounted on the circuit board, an antenna attached to the circuit board that transmits information related to the acceleration detected by the G sensor, and a molded resin portion that seals the G sensor, the circuit board, and the antenna, a sensor device having the above, where the molded resin portion includes a base portion that covers the circuit board and the G sensor, and a protruding portion that protrudes from the base part, the protruding portion includes a rod shaped portion with a longitudinal direction in one direction when viewed from a normal direction of the circuit board, and the longitudinal direction of the rod shaped portion is set at a predetermined angle with respect to an acceleration detection direction of the G sensor.

With such a configuration, an operator who attaches the tire mount sensor to the tires can easily recognize the acceleration detection direction of the G sensor by checking the direction of the protruding portion. Therefore, it is possible to easily adjust the acceleration detection direction of the G sensor with respect to the mounting surfaces of the tires. For example, it is possible to easily mount the tire mount sensor so that the acceleration detection direction of the G sensor coincides with the circumferential direction or the width direction of the tires.

EMBODIMENTS FOR CARRYING OUT INVENTION

Figure 1:
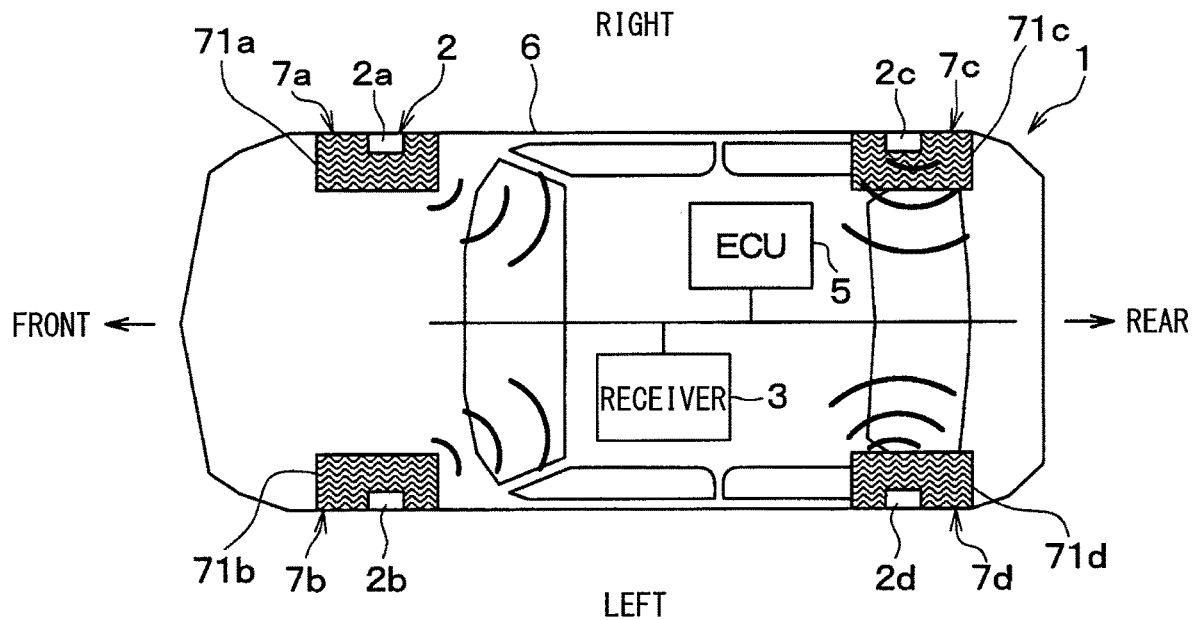
FIG. 1 shows a block configuration of a vehicle to which a tire mount sensor according to a first embodiment is applied.

Hereinafter, embodiments of the present disclosure will be described with reference to the drawings. In the following embodiments, the same or equivalent parts are denoted by the same reference numerals as each other, and explanations will be provided to the same reference numerals.

First Embodiment

A vehicle controller including a tire mount sensor according to the present embodiment will be described with reference to FIGS. 1 to 10. The vehicle controller according to the present embodiment is configured to detect the condition of a road for travelling (hereinafter simply referred to as a road surface condition) based on detection data sent from a tire mount sensor 2 provided in each wheel of a vehicle 1.

As shown in FIG. 1, the vehicle 1 is provided with a tire mount sensor 2, a receiver 3, an electronic control unit (hereinafter referred to as an ECU) 5 for controlling the vehicle, etc. The tire mount sensor 2, the receiver 3, and the ECU 5 constitute a vehicle controller that performs vehicle control based on the road surface condition.

Figure 2:
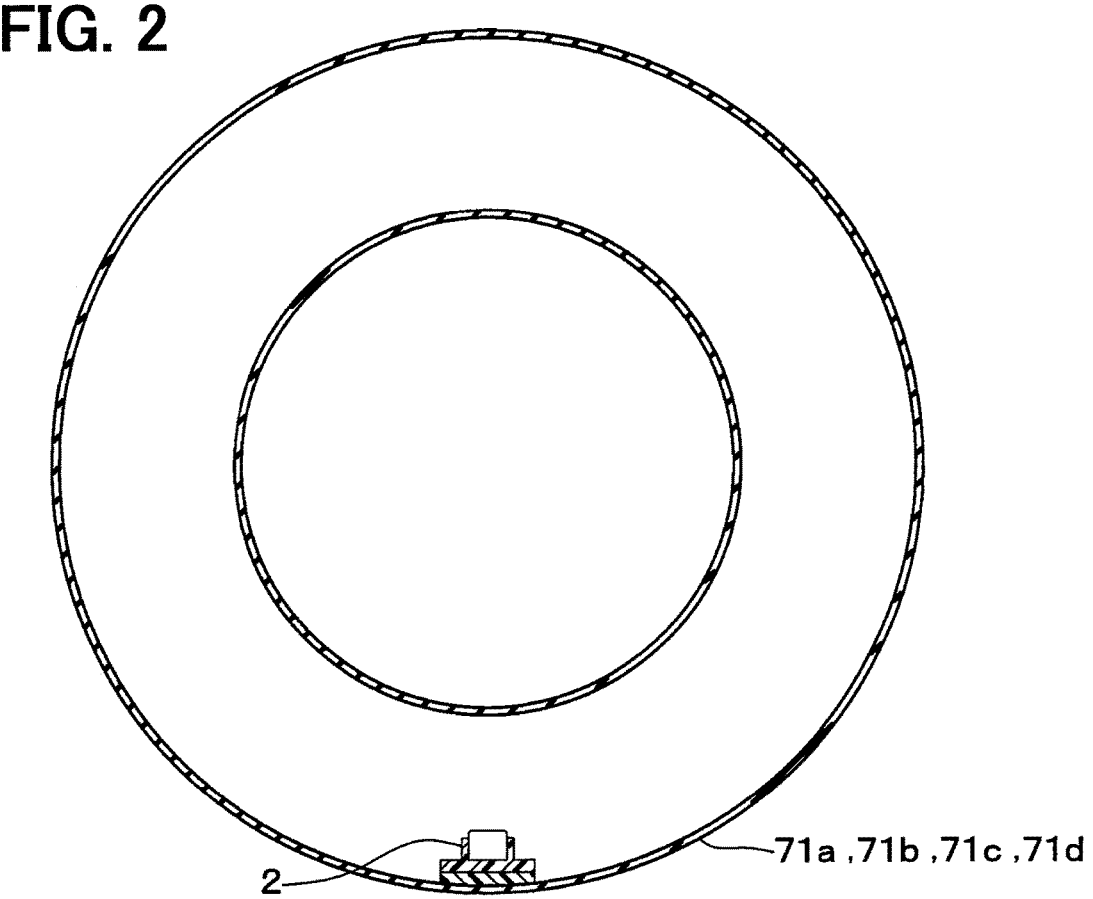
FIG. 2 is a schematic cross-sectional view showing a mounting state of a tire mount sensor to a tire.
Figure 3:
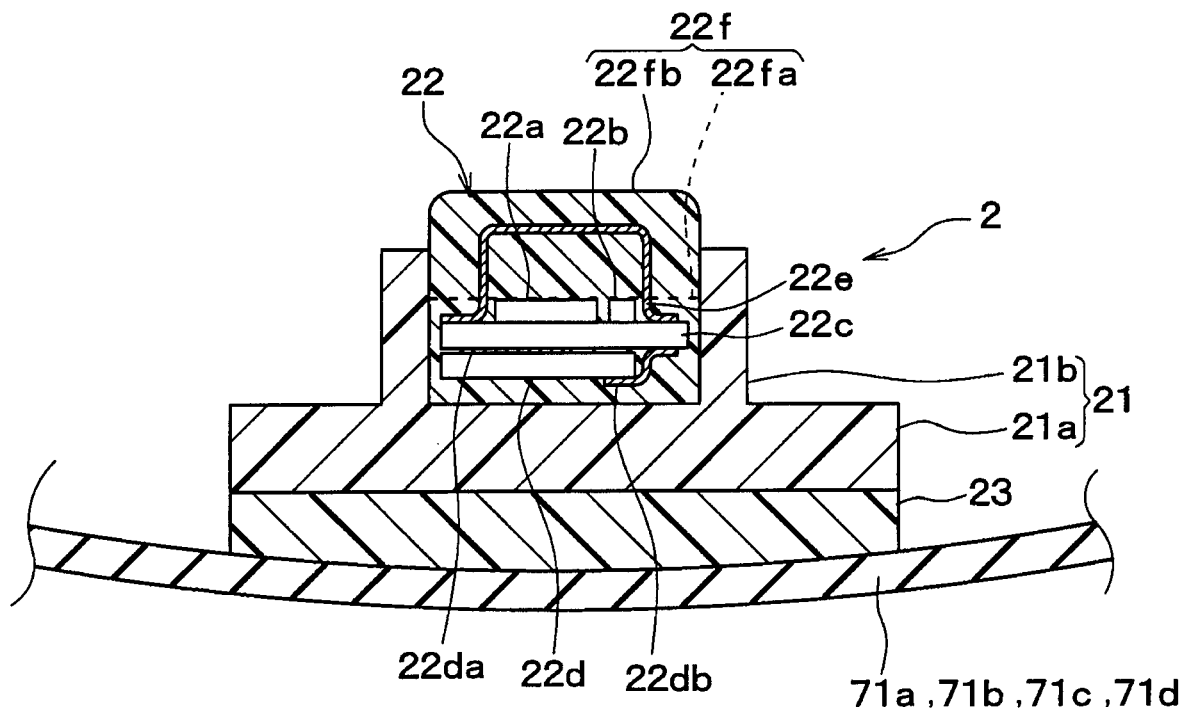
FIG. 3 is an enlarged sectional view of the vicinity of the tire mount sensor in FIG. 2.
Figure 4:
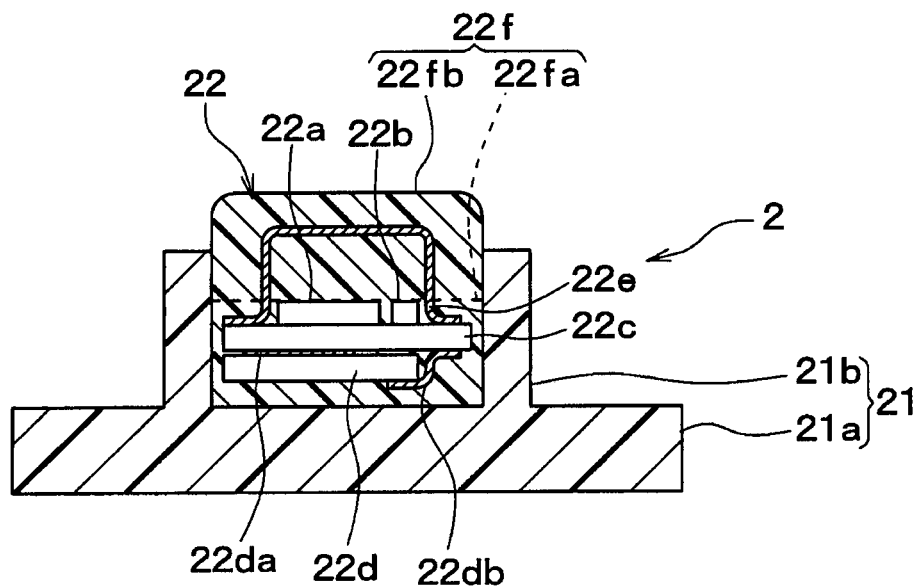
FIG. 4 is an enlarged sectional view of a tire mount sensor in FIG. 3.

As shown in FIGS. 1 to 3, the tire mount sensor 2 is attached to respective tires 71a to 71d of wheels 7a to 7d in the vehicle 1. In addition, the receiver 3 and the ECU 5 are mounted in a vehicle body 6 of the vehicle 1, and are connected to each other through an in-vehicle LAN (Local Area Network) such as CAN (Controller Area Network) to transmit information to each other.

The tire mount sensor 2 acquires various kinds of information relating to the tires 71a to 71d attached to the wheels 7a to 7d, and stores various kinds of information in a frame to transmit the information. In FIG. 1, the tire mount sensors 2 of each of the wheels 7a to 7d are indicated by reference numerals 2a to 2d, but they have the same structure. The receiver 3 receives a frame transmitted from the tire mount sensor 2 and performs various processing, calculations, etc. based on the acceleration detection results stored in the frame to detect the road surface condition for example. Details of the tire mount sensor 2 will be described with reference to FIGS. 3 to 8.

As shown in FIGS. 3 to 8, the tire mount sensor 2 includes a sensor retaining member 21 and a sensor device 22.

As shown in FIGS. 2 and 3, the sensor retaining member 21 is a member for retaining the sensor device 22 on the inner wall surface of the tires 71a to 71d, e.g., on the rear surface of the tread.

In the present embodiment, as shown in FIGS. 3 to 6, the sensor retaining member 21 has a bottom portion 21a and a retaining portion 21b.

The bottom portion 21a may be made of, for example, a plate-shaped member made of elastically deformable rubber, and is formed by a circular plate-shaped member in the present embodiment. One surface of the bottom portion 21a is adhered to the inner wall surface of the tires 71a to 71d. The retaining portion 21b is provided on the other surface of the bottom portion 21a opposite to the one surface adhered to the tires 71a to 71d. In the present embodiment, the bottom portion 21a is formed in a circular plate shape, but may be another shape such as a square plate shape or a shape different from a plate shape.

Figure 5:
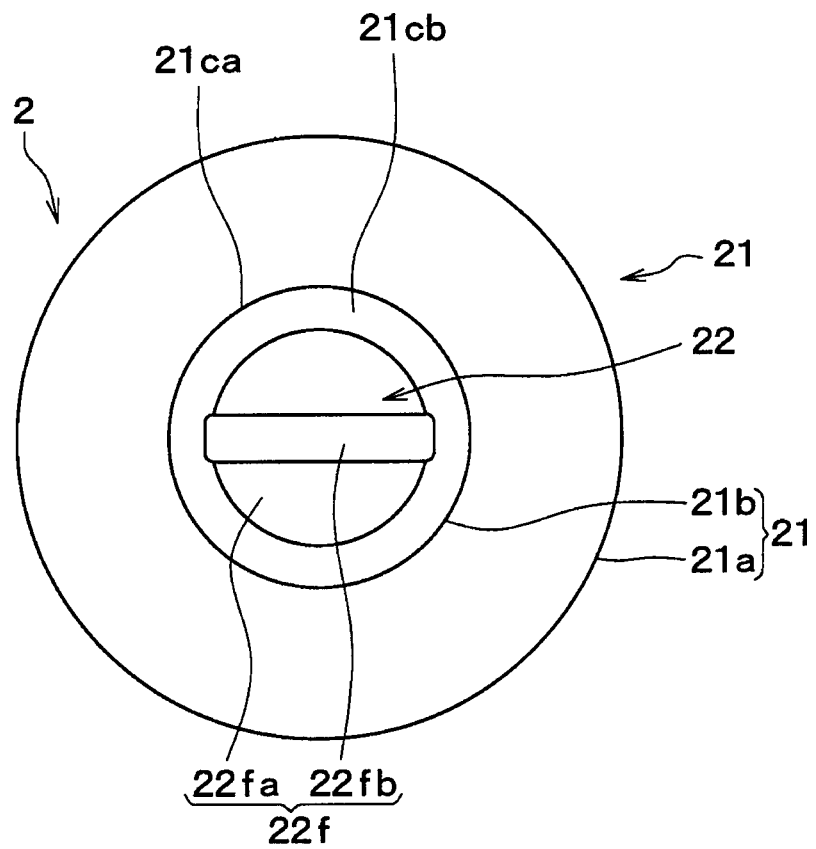
FIG. 5 is a top view of a tire mount sensor.
Figure 6:
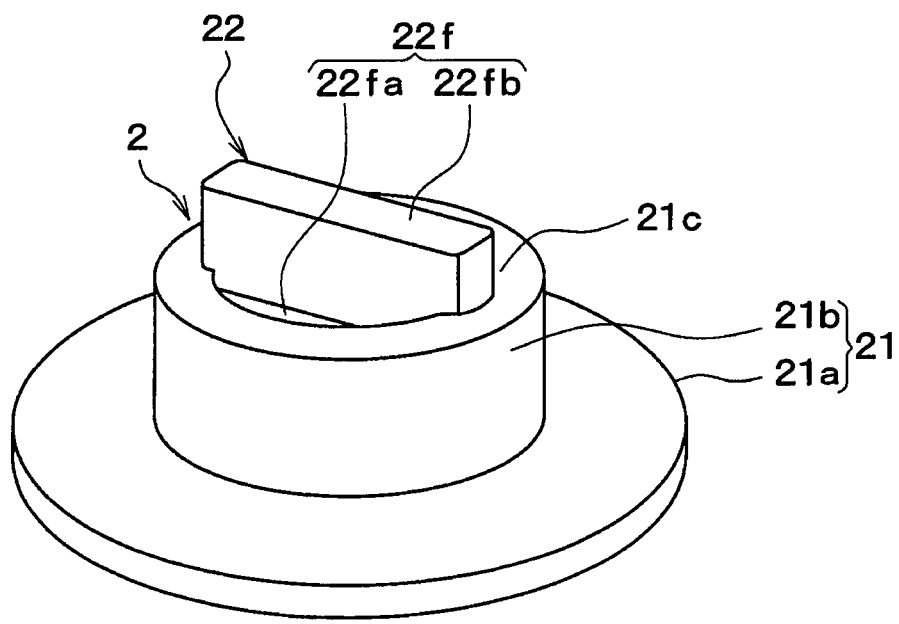
FIG. 6 is a perspective view of a tire mount sensor.
Figure 7:
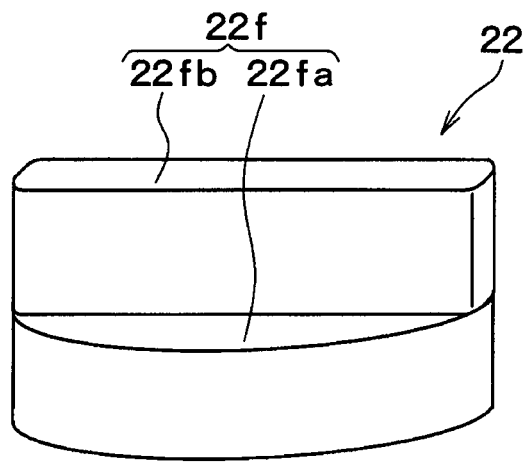
FIG. 7 is a perspective view of a sensor device.

The retaining portion 21b may be formed by, for example, a cylindrical member having a hollow inside, and in the present embodiment, the retaining portion 21b is formed by a cylindrical member. As shown in FIGS. 5 and 6, the retaining portion 21b is provided with a retaining segment 21c having an inner diameter which is reduced at least in part at an end opposite from the bottom portion 21a. The shape of the hollow portion of the retaining portion 21b has a shape corresponding to the outer shape of the sensor device 22 which is described later, and in the present embodiment this hollow portion is a cylindrical hollow portion. The sensor device 22 is disposed within a space on the inside of this hollow portion which is surrounded by the bottom portion 21a and the retaining portion 21b. The retaining portion 21b is also made of elastically deformable rubber for example, and is integrally formed with the bottom portion 21a.

The sensor device 22 includes a G sensor 22a, a MCU 22b, a circuit board 22c on which peripheral elements etc. (not shown) are mounted, a battery 22d which corresponds to a power supply, an antenna 22e, and a molded resin portion 22f.

The G sensor 22a outputs a detection signal corresponding to acceleration. In the present embodiment, the G sensor 22a detects acceleration according to the ground contact state of the tires 71a to 71d. The G sensor 22a is positioned to detect acceleration in the circumferential direction (that is, the tangential direction) of the tires 71a to 71d, or acceleration in the width direction of the tires 71a to 71d. Specifically, acceleration, i.e., vibration greatly changes when the portion of the tires 71a to 71d to which the G sensor 22a is attached contacts the road surface and also when this portion of the tires 71a to 71d separates again from the road surface after the contact. In addition, acceleration changes so as to vibrate according to the road surface condition during the ground contact. These are represented as detection signals of the G sensor 22a.

Figure 8:
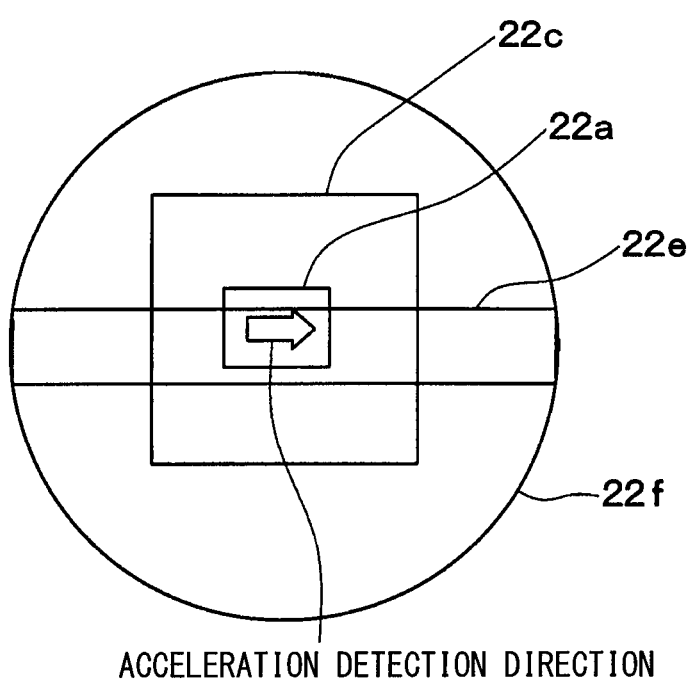
FIG. 8 is a top layout diagram illustrating the relationship between an acceleration detection direction of a G sensor in a sensor device and the longitudinal direction of a protruding portion.
Figure 9:
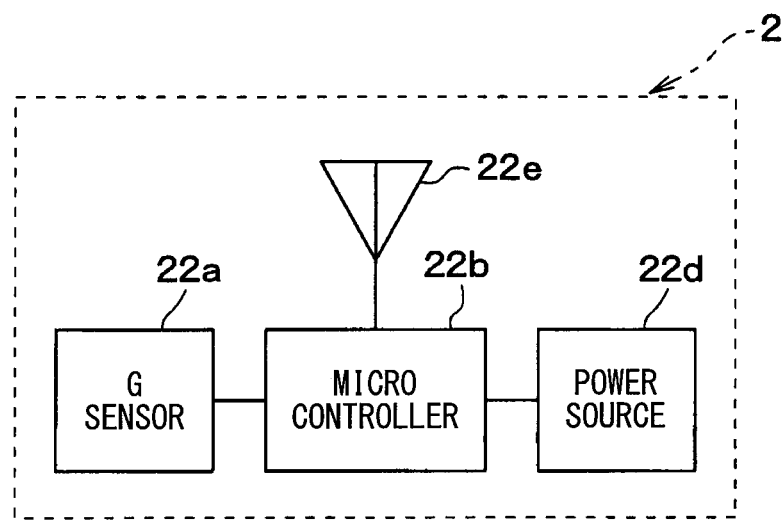
FIG. 9 shows a block configuration of a tire mount sensor.

Here, as the G sensor 22a, an explanation is provided for an example of a one-axis sensor that detects acceleration in one direction, i.e., performs acceleration detection along one axial direction which includes the direction of the arrow in FIG. 8 and direction to that arrow. However, as the G sensor 22a, it is also possible to use a two-axis sensor capable of detecting acceleration in two directions, or a multi-axis sensor such as a tri-axial sensor capable of detecting acceleration in three directions. If the G sensor 22a is a multi-axis sensor, at least one axis detects acceleration in the circumferential direction of the tires 71a to 71d or acceleration in the width direction of the tires 71a to 71d.

In the present embodiment, the G sensor 22a is formed on a semiconductor chip, and the substrate plane of the semiconductor chip is parallel to the circumferential direction and the width direction of the tires 71a to 71d. Specifically, the semiconductor chip on which the G sensor 22a is formed is mounted on the circuit board 22c so that the substrate plane of the semiconductor chip is parallel to the surface of the circuit board 22c. Then, by positioning the surface of the circuit board 22c to be in parallel to the tread rear surface of the tires 71a to 71d, the substrate plane of the semiconductor chip on which the G sensor 22 a is formed is also arranged to be parallel to the circumferential direction and the width direction of the tires 71a to 71d.

The MCU 22b is a conventional device having a CPU, ROM, RAM, I/O, etc., and executes predetermined processing according to programs stored in the ROM etc. The ROM etc. stores separate identification information including identification information unique to each receiver for identifying which of the tires 71a to 71d to which the tire mount sensor 2 is attached to, and identification information unique to the vehicle for identifying the vehicle of the tire mount sensor 2.

The MCU 22b receives the detection signal of the G sensor 22a, performs signal processing on the signal to process the signal as necessary, and creates information related to the acceleration representing the detection result. Then, the MCU 22b stores the information related to the acceleration together with the ID information of each tire mount sensor 2 in the frame. Also, when the MCU 22b creates a frame, it sends it to a transmitting unit such as an RF circuit, which may be provided inside the MCU 22b or as a peripheral element which is not illustrated. Then, the frame is transmitted from the antenna 22e to the receiver 3 via the transmitting unit. In the present embodiment, since an RF band signal is used, an RF circuit is used as the transmitting unit, but signals in bands other than the RF band may be used. In that case, the transmitting unit may be formed by a circuit corresponding to the band to be used.

The circuit board 22c is a circuit board on which the G sensor 22a, the MCU 22b, peripheral elements, etc. are mounted, and is formed by a printed board, for example, on which a circuit pattern is formed. By mounting the G sensor 22a, the MCU 22b, etc. on the circuit board 22c, a circuit for acceleration detection by the G sensor 22a and transmitting acceleration-related information from the sensor device 22 is formed. Specifically, the G sensor 22a, the MCU 22b, etc. are mounted on one side of the circuit board 22c, and the battery 22d is disposed on the other side, which is opposite from the one side. Further, on the one side of the circuit board 22c, a pad (not shown), on which the antenna 22e is mounted, is provided at a position different from the locations where the G sensor 22a and the MCU 22b are arranged, and the antenna 22e is mounted to the pad by being soldered etc.

On the other side of the circuit board 22c, there is provided a pad 22da electrically connected to one electrode of the battery 22d, e.g., a plus electrode, and a terminal 22db electrically connected to the other electrode, e.g., a minus electrode. Penetrating electrodes (not shown) etc. are formed in the circuit board 22c, and electrical connection between one side and the other side is enabled through the penetrating electrodes.

The battery 22d is a power source, and is arranged on the other side of the circuit board 22c. One of the electrodes of the battery 22d is in contact with the pad 22da and the other electrode is in contact with the terminal 22db, thereby supplying power to the various units included on the circuit board 22c. Here, a case where the battery 22d is used as a power source is described, but a power source that receives power supply by a generator or a transponder method may be used as a power source as well. Upon receiving power supply from the battery 22d, the G sensor 22a, the MCU 22b, peripheral elements etc. operate.

The antenna 22e is configured to transmit a frame transmitted from the transmitting unit to outside. In the present embodiment, a loop antenna is used as the antenna 22e, configured in an arch shape having one direction as a longitudinal direction as seen from the normal direction of the circuit board 22c. The loop antenna includes two ends which are connected to separate pads on the circuit board 22c. When the antenna 22e is formed of a loop antenna, the antenna 22e stands upright from the circuit board 22c, thus the antenna 22e protrudes a predetermined height from the surface of the circuit board 22c. Further, for the antenna 22e, other types of antennas such as a monopole antenna, a patch antenna, etc. may be used instead of a loop antenna. When the antenna 22e is formed by a loop antenna, the transmission radio wave is radiated toward the outer periphery of the loop formed by the antenna 22e. When the antenna 22e is of a type different from that of the loop antenna, transmission radio waves are output according to that type.

Here, the orientation of the antenna 22e is arranged such that the longitudinal direction of the antenna 22e when viewed from the normal direction of the circuit board 22c (hereinafter simply referred to as the longitudinal direction of the antenna 22e) is a predetermined angle with respect to the acceleration detection direction of the G sensor 22a. In the present embodiment, the angle of the antenna 22e is adjusted so that the longitudinal direction of the antenna 22e is in the same direction as the acceleration detection direction of the G sensor 22a, i.e., the angle between these two directions is 0 degrees.

The molded resin portion 22f is formed by insert molding and sealing the circuit board 22c on which the antenna 22e is mounted in addition to the G sensor 22a, the MCU 22b, peripheral devices, etc., and a battery 22d connected to the other side of the circuit board 22c. The molded resin portion 22f has a shape with a plate portion 22fa which corresponds to a base portion, and a rectangular protruding portion 22fb on one side of the plate portion 22fa. The plate portion 22fa is a portion that seals the circuit board 22c and the battery 22d together with the G sensor 22a, the MCU 22b, the peripheral devices, etc., and has one surface and another surface parallel to the surface of the circuit board 22c. In the case of this embodiment, the plate portion 22fa is formed in a circular plate shape.

The protruding portion 22fb is a portion that seals the antenna 22e and is shaped like a rod when viewed from the normal direction with respect to the surface of the circuit board 22c. The longitudinal direction of the protruding portion 22fb is the same direction as the longitudinal direction of the antenna 22e. In other words, the molded resin portion 22f does not have the same thickness at both the portion of the circuit board 22c where the antenna 22e is not positioned and the portion of the circuit board 22c where the antenna 22e is located. Instead, the molded resin portion 22f has a greater thickness at the portion where the antenna 22e is positioned as compared to the portion where the antenna 22e is not positioned. Therefore, the amount of resin used by the molded resin portion 22f can be reduced as compared to a case where the molded resin portion 22f is formed with the same thickness everywhere. In addition, the longitudinal direction of the protruding portion 22fb coincides with the longitudinal direction of the antenna 22e.

The tire mount sensor 2 configured as described above may be formed, for example, by pushing open the space between the retaining segment 21c of the sensor retaining member 21 through elastic deformation, and then placing the sensor device 22 in the space surrounded by the sensor retaining member 21. Then, in this state, an adhesive 23 is applied to the back side of the bottom portion 21a of the sensor retaining member 21, and the tire mount sensor 2 may be attached to the inner wall surface of each of the tires 71a to 71d, e.g., the back surface of the tread via the adhesive 23. In this manner, the tire mount sensor 2 is mounted inside the tires 71a to 71d.

Further, since the tire mount sensor 2 configured as described above merely holds the sensor device 22 with respect to the sensor retaining member 21, it is possible to remove the sensor device 22 from the sensor retaining member 21. In other words, it is possible to push open the retaining segment 21c and remove the sensor device 22 from the sensor retaining member 21.

In this manner, the sensor device 22 is configured to be detachable from the sensor retaining member 21. Therefore, when replacing a tire for example, the sensor device 22 can be removed from the sensor retaining member 21 and reused, while only the sensor retaining member 21 of the tire mount sensor 2 is discarded.

Figure 10:
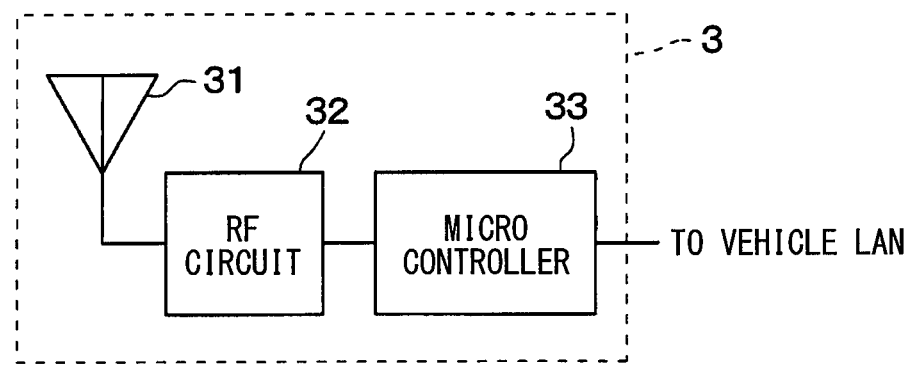
FIG. 10 shows a block configuration of a receiver.

Meanwhile, as shown in FIG. 10, the receiver 3 includes an antenna 31, an RF circuit 32, a microcontroller (MCU) 33, etc.

The antenna 31 is for receiving data frames sent from each tire mount sensor 2. The antenna 31 is fixed to the vehicle body 6.

The frames received by the antenna 31 from each tire mount sensor 2 are input to the RF circuit 32. The RF circuit 32 functions as a receiving circuit for sending the frames to the MCU 33. Here, the RF circuit 32 is used as the receiving circuit, but it is a receiving circuit corresponding to the frequency band used.

The MCU 33 is a conventional device having a CPU, ROM, RAM, I/O, etc., and executes road surface condition detection processing according to programs stored in the ROM etc. For example, the MCU 33 stores the ID information of each tire mount sensor 2 and the positions of the respective wheels 7a to 7d to which the tire mount sensors 2 are attached in association with each other. Then, the MCU 33 detects the road surface condition of the traveling road surface of each of the wheels 7a to 7d based on the ID information and the acceleration information stored in the frames sent from each tire mount sensor 2.

Specifically, the MCU 33 detects the road surface condition based on the acceleration-related information stored in the frame, that is, the acceleration detection results. For example, the acceleration waveform includes a maximum value at the start of ground contact when a portion of the tread corresponding to the location of the tire mount sensor 2 begins contact with ground as the tires 71a to 71d rotate. Then, the acceleration waveform includes a minimum value at the time of ground separation where the portion of the tread corresponding to the location of the tire mount sensor 2, which is in contact with the ground, separates from the ground. The section during which the acceleration waveform changes from the maximum value to the minimum value is a grounded section, and in this grounded section, the acceleration waveform has a waveform corresponding to the road surface condition.

For example, the acceleration waveform differs when travelling on a high μ road with a relatively high road surface friction coefficient (hereinafter referred to as μ) such as an asphalt road, than when traveling on a low μ road surface having a relatively low road surface μ such as a frozen road. In other words, when the vehicle is traveling on a low μ road surface, due to the influence of the road surface μ, small, high-frequency vibrations due to slipping of the tires 71a to 71d are superimposed on the output voltage. For this reason, when frequency analysis is performed on the acceleration waveform in the contact section, for the case of traveling on a high μ road surface and the case of traveling on a low μ road surface, the level of high frequency components varies depending on the road surface condition. Specifically, the level of high frequency components is high in the case of traveling on low μ roads as compared to the case of traveling on high μ roads. For this reason, the level of high-frequency components in the acceleration waveform is an index representing the road surface condition, and the road surface μ can be detected based on this.

Although the road surface μ has been described here, the acceleration waveform also varies depending on whether the road surface is a dry road or a wet road. This can also be detected by analyzing the frequency etc. of the acceleration waveform.

In this manner, it is possible to detect the road surface condition such as the road surface μ or whether the road is a dry road or wet road based on the acceleration waveform.

The ECU 5 acquires information related to the road surface condition, that is, information related to the road surface μ and the temperature of the road surface from the receiver 3, and executes vehicle control. For example, the ECU 5 may be a brake ECU. In the case where the ECU 5 is a brake ECU, anti-lock brake control, side-slip prevention control, etc. may be performed using the acquired road surface μ. For example, in the case of a frozen road etc., it is possible to control wheel slip etc. by reducing the braking force generated when a driver operates the brakes, such that the amount of braking force generated is weaker as compared to when driving on an asphalt road etc.

Further, when the ECU 5 can communicate to outside of the vehicle using a communication device (not shown) such as a navigation ECU, and in this case the road surface state information can be conveyed to a communication center by road-to-vehicle communication. In this case, the communication center may map the information on road surface conditions and may notify subsequent vehicles, for example. Similarly, information on the road surface condition can be conveyed to an immediately behind vehicle by inter-vehicle communication. In this way, it is possible for the succeeding vehicles to grasp the condition of the road surface beforehand and apply it to vehicle controls, thereby making it possible to improve vehicle safety.

The vehicle controller including the tire mount sensor 2 according to the present embodiment is configured as described above.

In the vehicle controller configured as described above, the protruding portion 22fb is provided on the molded resin portion 22f of the tire mount sensor 2, and the longitudinal direction of the protruding portion 22fb is aligned with the longitudinal direction of the antenna 22e. Further, the longitudinal direction of the antenna 22e is set at a predetermined angle with respect to the acceleration detection direction of the G sensor 22a. In the present embodiment, the predetermined angle is 0°, and the longitudinal direction of the antenna 22e coincides with the acceleration detection direction of the G sensor 22a.

With such a configuration, an operator who attaches the tire mount sensor 2 to the tires 71a to 71d can easily recognize the acceleration detection direction of the G sensor 22a by checking the direction of the protruding portion 22fb. Therefore, it is possible to easily adjust the acceleration detection direction of the G sensor 22a with respect to the mounting surfaces of the tires 71a to 71d. For example, it is possible to easily mount the tire mount sensor 2 so that the acceleration detection direction of the G sensor 22a coincides with the circumferential direction or the width direction of the tires 71a to 71d.

Further, the thickness of the molded resin portion 22f can be reduced for portions other than the portion where the antenna 22e is positioned on the circuit board 22c, so that the amount of resin used for the molded resin portion 22f can be reduced. In other words, it is also possible to form the molded resin portion 22f in a cylindrical shape and form a mark by a depression on the top side to indicate the acceleration detection direction of the G sensor 22a. However, in this case, it is necessary to also increase the thickness of the molded resin portion 22f in the portions of the circuit board 22c other than the antenna 22e, and it is necessary to increase the thickness of the molded resin portion 22f by an amount corresponding to the recess for forming the mark, and so the thickness of the entire molded resin portion 22f becomes thicker. For this reason, the resin amount of the molded resin portion 22f would be increased.

Further, in the case where the protruding portion 22fb is formed as in this embodiment, then by providing a circumferential clearance between the retaining segment 21c and the protruding portion 22fb for example, the angle of the sensor device 22 may be adjusted without detaching the sensor device 22 from the sensor retaining member 21. However, in an embodiment where a mark is formed as a recess in the molded resin portion 22f as described above, unless the sensor device 22 is removed from the sensor retaining member 21, it would not be possible to adjust the angle of the sensor device 22. Therefore, even when the sensor retaining member 21 is attached to the tires 71a to 71d, angle adjustment of the sensor device 22 can be easily performed.

There is also a case where the tire mount sensor 2 is attached to a jig (not shown) and the tire mount sensor 2 is attached to the tires 71a to 71d by using a jig. In this case, if a concave portion corresponding to the protruding portion 22fb is provided on the jig side, by fitting the tire mount sensor 2 to the jig so that the protruding portion 22fb is fitted into the concave portion, the tire mount sensor 2 can be oriented to an angle of when mounted on the tires 71a to 71d. This makes it possible to easily set the acceleration detection direction of the G sensor 22a to a desired angle even when a jig is used.

Further, in the present embodiment, a loop antenna is used as the antenna 22e. In the case of a loop antenna, while a certain amount of height is required, it is possible to obtain a high gain. Further, a loop antenna may be manufactured easily and at low cost by simply forming a plate shaped conductor body into an arch shape.

Further, in the present embodiment, the tire mount sensor 2 is formed by the sensor retaining member 21 and the sensor device 22, but the tire mount sensor 2 can be formed only by the sensor device 22 without using the sensor retaining member 21. In this case, for example, it is possible to attach the tire mount sensor 2 to the tires 71a to 71d by, e.g., directly attaching the molded resin portion 22f of the sensor device 22 to the tires 71a to 71d. However, when the tire mount sensor 2 is formed by the sensor retaining member 21 and the sensor device 22, it is possible to remove the sensor device 22 from the sensor retaining member 21 when replacing the tires 71a to 71d. For this reason, although the sensor retaining member 21 is discarded, the sensor device 22 can be reused.

Other Embodiments

The present disclosure is not limited to the above-described embodiments, and can be appropriately modified.

For example, in the above-described embodiments, the case where the protruding portion 22fb is in the form of a rod when viewed from the normal direction of the circuit board 22c was described, but it is only required that the protruding portion 22fb has a rod shaped portion. That is, the protruding portion 22fb is not limited to being a simple rod shaped portion, and does not need to have a constant width. For example, the protruding portion 22fb may have a cross shape or a T shape, or it may be formed by a shape having a rod shaped portion such as two parallel lines. With respect to the cross shape and the T shape, it is not necessary for each of these lines to have the same length, i.e., lengthening one line and shortening another line crossing the longer line is possible. In that case, for example, if a longer line is used to seal the antenna 22e, the amount of resin in a portion of the protruding portion 22fb other than the portion sealing the antenna 22e can be reduced, it would be easier to discern the direction of the antenna 22e, i.e., the acceleration detection direction of the G sensor 22a. Further, in the case of forming two protruding portions 22fb, it is possible to adopt a structure including two antennas 22e, or only one of the antennas 22e may be sealed. In the case of forming two protruding portions 22fb, the two may have the same size or may be formed with different sizes.

Further, although the molded resin portion 22f includes the plate shaped portion 22fa and the protruding portion 22fb, the plate shaped portion 22fa is not necessary as long as the molded resin portion 22f includes a base portion covering the circuit board 22c and the G sensor 22a and the protruding portion 22fb protrudes from the base portion. For example, the surface of the base portion may be a curved surface, or irregularities may be present on the surface, as long as the protruding portion 22fb protrudes from the base portion and can be distinguished from the base portion.

Further, in the case of applying a loop antenna as the antenna 22e as described in the above embodiments, the antenna 22e has a structure protruding from one side of the circuit board 22c, but in the case of another type, for example a patch antenna, the structure of the antenna may not protrude outward. Even in such a case, a part of the molded resin part 22f may be provided with a protruding portion 22fb that is set at a predetermined angle with respect to the acceleration detection direction of the G sensor 22a, with no relationship to the antenna 22e.

Further, an example is provided in which the longitudinal direction of the protruding portion 22fb is at a predetermined angle of 0° with respect to the acceleration detection direction of the G sensor 22a, but this may be any fixed angle. In particular, if the longitudinal direction of the protruding portion 22fb is set to 0° or 90° with respect to the acceleration detection direction of the G sensor 22a, the operator can more easily detect the acceleration detection direction of the G sensor 22a by looking at the protruding portion 22fb.

Further, the arrangement of the G sensor 22a, the MCU 22b, the battery 22d, etc. on the circuit board 22c is merely exemplary, and other arrangements may be adopted.

Further, in the above-described embodiments, an example in which the road surface condition is detected by the acceleration detected by the G sensor 22a has been described, but the acceleration detected by the G sensor 22a may be applied to things other than road surface conditions. For example, in the detection of the tire condition, specifically the vibration in the width direction of the tire, that is, the acceleration varies according to the groove depth of the tire. Accordingly, the tire mount sensor 2 may be used to detect acceleration in the width direction of the tire in order to detect the groove depth of the tire. Further, the acceleration detected by the G sensor 22a can be used for detecting tire air pressure. In addition to the G sensor 22a, another physical quantity sensor such as a temperature sensor, a pressure sensor, etc. may be mounted on the circuit board 22c, and these other physical quantity sensors may also be sealed in the molded resin portion 22f.

What is claimed is:

1. A tire mount sensor attached to an inner wall surface of a tire, comprising:
   a sensor device including
      an acceleration sensor that detects acceleration acting on the tire;
      a circuit board having one surface and another surface opposite to the one surface, the acceleration sensor being mounted on the circuit board;
      an antenna attached to the circuit board that transmits information related to the acceleration detected by the acceleration sensor; and
      a molded resin portion that seals the acceleration sensor, the circuit board, and the antenna, wherein
   the molded resin portion includes a base portion that covers the circuit board and the acceleration sensor, and a protruding portion that protrudes from the base part,
   the protruding portion includes a rod shaped portion with a longitudinal direction in one direction when viewed from a normal direction of the circuit board, and the longitudinal direction of the rod shaped portion is set at a predetermined angle with respect to an acceleration detection direction of the acceleration sensor.

2. The tire mount sensor according to claim 1, wherein the base portion is formed by a plate shaped portion having one surface and another surface which are parallel to the surfaces of the circuit board, and
the protruding portion protrudes from the one surface of the plate shaped portion.

3. The tire mount sensor according to claim 1, wherein the acceleration detection direction of the acceleration sensor is parallel to the one surface of the circuit board.

4. The tire mount sensor according to claim 1, wherein the acceleration sensor is a multi-axis sensor having a plurality of directions as acceleration detection directions, and
one of the plurality of directions is at a predetermined angle with the rod shaped portion.

5. The tire mount sensor according to claim 1, wherein the protruding portion is formed as any one of: a rod shape constituted only by the rod shaped portion, a cross shape or a T shape having the rod shaped portion as one line and another line that intersects this line, or two parallel lines including the rod shaped portion.

6. The tire mount sensor according to claim 1, wherein the protruding portion is, among the molded resin portion, a portion that covers the antenna positioned to protrude from a surface of the circuit board.

7. The tire mount sensor according to claim 1, further comprising:
a sensor retaining member including a bottom portion that forms a mounting surface to be attached to the tire and a retaining portion that forms a hollow portion with the bottom portion, the sensor device being disposed in the hollow portion, wherein
the sensor device is attached to the tire in a state of being held within the hollow portion by the sensor retaining portion, and is detachable from the sensor retaining member.

* * * * *